T. J. FEGLEY & G. O. LEOPOLD.
SPIRAL TOOL DRIVER.
APPLICATION FILED MAY 22, 1909.
979,939.
Patented Dec. 27, 1910.
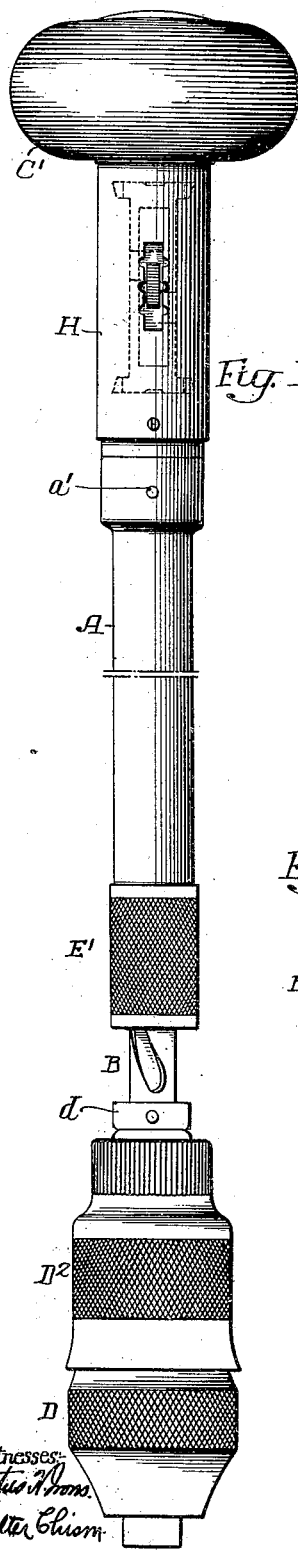
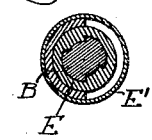
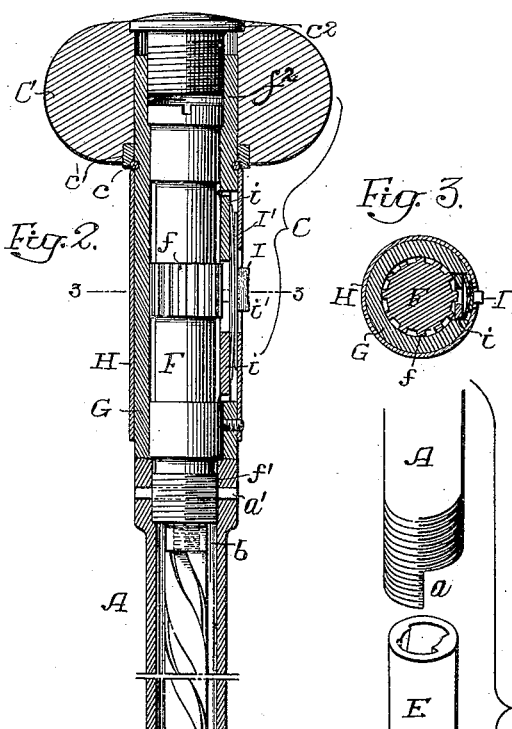
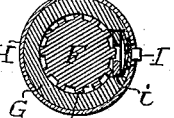
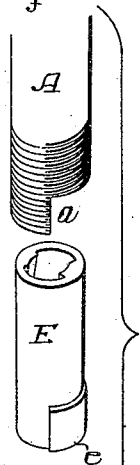
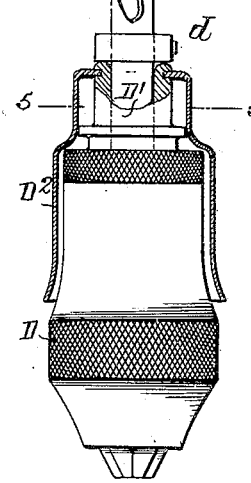
Inventors,—
Thomas J. Fegley,
George O. Leopold,
by their Attorneys

UNITED STATES PATENT OFFICE.

THOMAS J. FEGLEY AND GEORGE O. LEOPOLD, OF PHILADELPHIA, PENNSYLVANIA, ASSIGNORS TO NORTH BRO'S M'F'G CO., OF PHILADELPHIA, PENNSYLVANIA, A CORPORATION OF PENNSYLVANIA.

SPIRAL TOOL-DRIVER.

979,939.     Specification of Letters Patent.     Patented Dec. 27, 1910.

Application filed May 22, 1909. Serial No. 497,652.

*To all whom it may concern:*

Be it known that we, THOMAS J. FEGLEY and GEORGE O. LEOPOLD, citizens of the United States, residing in Philadelphia, Pennsylvania, have invented certain Improvements in Spiral Tool-Drivers, of which the following is a specification.

One object of our invention is to so construct a push drill or screw driver that the ratchet mechanism can be placed near the handle end, so that it can be shifted by the hand without releasing the hold upon the drill. A tool of this type can thus be made any length desired.

A further object is to provide means which can be grasped by the hand for holding the drill or screw driver in position at the chuck end.

A still further object is to provide means for securing the removable nut in position.

These objects we attain in the following manner, reference being had to the accompanying drawing, in which:—

Figure 1, is a side view of our improved push drill or screw driver; Fig. 2, is a longitudinal sectional view; Fig. 3, is a transverse sectional view on the line 3—3, Fig. 2; Fig. 4, is a transverse sectional view on the line 4—4, Fig. 2; Fig. 5, is a transverse sectional view on the line 5—5, Fig. 2; and Fig. 6, is a detached perspective view showing the detachable nut and the means for locking it in position.

This invention is designed particularly for use in places difficult of access but which can be reached by a comparatively long tool, such as in car work, cabinet work, etc., although it will be understood that it can be used for other purposes without departing from the essential features of the invention.

In the drawings A is the hollow stem of the drill, in which is mounted the spindle B having a spiral groove cut therein.

C is the handle section carrying the ratchet mechanism and the handle proper C', which is shaped to fit the palm of the hand.

Secured to the spindle B is a chuck D which may be of any ordinary type.

In order to allow one hand to grasp the outer end of the tool without holding the chuck, we provide a shell $D^2$ which extends over the rear end of the chuck and is secured to a sleeve D' mounted on the spindle B between the rear end of the chuck and a collar $d$. The shell $D^2$ in the present instance has an internal flange over which the end of the sleeve D' is upset, as shown in Fig. 2, to hold it to the sleeve; the outer surface of the shell is preferably roughened.

By inclosing the chuck in the shell, as shown, there is no liability of the operator grasping the chuck, which would have a tendency to actuate the jaws and release the drill bit or screw driver.

The part which is liable to wear away more rapidly than other parts of the device is the nut E, through which the spiral stem passes and by which the stem is given rotary movement. This nut is made, in the present instance, as shown in Figs. 2 and 6, and has a projection $e$ adapted to a recess $a$ in the threaded end of the stem A; when this projection is in the recess it cannot turn in the stem and consequently it must turn the spindle. It is held in position by a threaded cap E' which is adapted to the end of the stem, as shown in Fig. 2. By simply taking off the cap the nut can be removed and another nut placed in position. On the upper end of the spindle is a nut $b$ which prevents the spindle being detached from the stem when drawn out to its full extent.

F is the ratchet stem having the ratchet wheel $f$ made integral with it in the present instance, and the lower end of this stem is screw threaded at $f'$ and is adapted to a threaded opening in the main stem A; the two parts being locked together by a pin $a'$. On the opposite end of the ratchet stem F is a head $f^2$, which rests upon a shoulder on the casing. This ratchet stem is held in position by the head at one end and the end of the hollow stem at the other end. The end of the stem is notched for the reception of a screw driver when it is desired to hold the ratchet stem on detaching the hollow stem. The head end of the ratchet stem is inclosed by a screw $C^2$ adapted to a thread in the end of the casing.

G is the casing extending from the upper end of the stem A into the handle C' and carrying the ratchet mechanism. Mounted in a groove in the casing G is a wire ring $c$ which forms a shoulder for the reception of a ring $c'$ which is adapted to a cavity in the handle C'; the handle being made of wood, fiber or other suitable material and the handle being held in position by a large screw $c^2$ adapted to a thread in the end of the casing G, as shown in Fig. 2.

$i, i$ are pawls pivoted to the casing G and adapted to engage the teeth of the ratchet wheel $f$.

I is the pawl shifter having a projection $i''$ which extends through a slot in the shell H, and between the pawl shifter I and the pawls is a spring plate I', which rests directly upon the pawls.

When the shifter is in its upper position it bears upon the heel of the upper pawl, throwing it out and pressing the lower pawl into position, causing the handle to turn the drill to the left, ratcheting to the right. When the shifter is moved to the lower position it throws the lower pawl $i$ out, pressing the upper pawl into engagement with the ratchet wheel and the handle will then turn the drill to the right and ratchet to the left. When the shifter is moved to the central position it locks both pawls into engagement with the ratchet wheel and consequently the spindle is locked so that the drill will turn either to the right or the left with the handle.

It will be noticed that the ratchet mechanism is placed close to the handle so that the hand that is pressed against the end of the handle can readily shift the pawls without releasing its hold on the handle.

The tool is especially adapted for rapid drilling, such as piece work, where the operator will not take the time to shift the pawls. After the pawls are set to drill a hole the tool is reciprocated and when the required depth is reached by simply pressing the shifter with the thumb and withdrawing the handle the drill will turn back without ratcheting and will turn out of the hole, as the pressure without shifting will force both pawls into engagement with the wheel.

By the above construction it will be seen that we make a comparatively simple and effective tool, which can be made any length desired and in which the nut can be readily detached and replaced when necessary, and in which the ratchet mechanism can be held to the work without liability of the chuck jaws being released when the pawl is held at the chuck end.

We claim:—

1. The combination in a push drill or screw driver, of a handle portion consisting of a casing and a handle proper secured thereto, a ratchet stem mounted in the handle casing, pawls and a shifter carried by the handle casing, said pawls arranged to engage the ratchet stem, a head on one end of the stem resting against a shoulder on the casing, a hollow stem attached to the opposite end of the ratchet stem and bearing against the end of the casing, thus holding the ratchet stem in the proper position, a nut carried by the hollow stem, and a spiral spindle mounted in the hollow stem and engaged by the nut.

2. The combination in a push drill or screw driver, of a handle, a ratchet stem mounted in the handle, a ratchet wheel thereon, pawls carried by the handle, said pawls engaging the ratchet wheel, a shifter for throwing either one or other of the pawls into engagement with the ratchet wheels, a hollow stem secured to the ratchet stem, a nut located at the end of said hollow stem, a spindle having a spiral groove therein with which the nut meshes, and a chuck carried by the end of the spindle.

3. The combination in a push drill or screw driver, of a casing, ratchet mechanism inclosed by the casing, a spiral spindle actuated by said ratchet mechanism, a ring forming a shoulder and mounted on the casing, a wire ring entering a recess in the casing and holding the shoulder ring in place, a handle mounted on the casing, a screw adapted to a thread in the end of the casing, the head of the screw extending over the handle so that the handle is confined between the shoulder ring and the head of the screw.

4. The combination in a push drill or screw driver, of a ratchet stem in the handle, a hollow stem secured to the ratchet stem and recessed at the lower end, a nut mounted within the hollow stem and having a projection adapted to rest in the stem, a threaded cap retaining the nut in the stem, and a spiral spindle mounted in the hollow stem and engaged by the nut.

In testimony whereof, we have signed our names to this specification, in the presence of two subscribing witnesses.

THOMAS J. FEGLEY.
GEORGE O. LEOPOLD.

Witnesses:
WM. E. SHUPE,
WM. A. BARR.